United States Patent
Kanbe et al.

(10) Patent No.: US 9,250,616 B2
(45) Date of Patent: Feb. 2, 2016

(54) PROCESS CONTROL SYSTEM

(71) Applicant: YOKOGAWA ELECTRIC CORPORATION, Musashino-shi, Tokyo (JP)

(72) Inventors: Takahiro Kanbe, Tokyo (JP); Mitsuhiro Yamamoto, Tokyo (JP); Eiji Nagai, Tokyo (JP); Masatoshi Takubo, Tokyo (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 492 days.

(21) Appl. No.: 13/848,470

(22) Filed: Mar. 21, 2013

(65) Prior Publication Data

US 2013/0253897 A1    Sep. 26, 2013

(30) Foreign Application Priority Data

Mar. 23, 2012  (JP) .................................. 2012-068042

(51) Int. Cl.

| | |
|---|---|
| *G06G 7/48* | (2006.01) |
| *G06G 7/62* | (2006.01) |
| *G05B 11/01* | (2006.01) |
| *G05B 15/00* | (2006.01) |
| *G05B 17/02* | (2006.01) |
| *G05B 19/042* | (2006.01) |

(52) U.S. Cl.
CPC ............... *G05B 11/01* (2013.01); *G05B 17/02* (2013.01); *G05B 19/0426* (2013.01); *G05B 2219/25428* (2013.01); *G05B 2219/31121* (2013.01); *G05B 2219/32342* (2013.01)

(58) Field of Classification Search
CPC .... G05B 11/01; G05B 17/02; G05B 19/0426; G05B 2219/25428; G05B 2219/31121; G05B 2219/32342

USPC .............................. 703/6, 13; 700/12, 75, 282
See application file for complete search history.

(56) References Cited

U.S. PATENT DOCUMENTS

| | | | |
|---|---|---|---|
| 2007/0005266 A1 | 1/2007 | Blevins et al. | |
| 2011/0178611 A1* | 7/2011 | Daraiseh ............ | G05B 19/4184 700/80 |
| 2012/0084400 A1* | 4/2012 | Almadi ................. | H04L 41/069 709/219 |
| 2013/0191106 A1* | 7/2013 | Kephart ................. | G05B 17/02 703/21 |

FOREIGN PATENT DOCUMENTS

| | | |
|---|---|---|
| JP | 2003-5821 A | 1/2003 |
| JP | 2004-029910 A | 1/2004 |
| JP | 2007-323173 A | 12/2007 |
| JP | 2008-021135 A | 1/2008 |

\* cited by examiner

*Primary Examiner* — Kamini S Shah
*Assistant Examiner* — Andre Pierre Louis
(74) *Attorney, Agent, or Firm* — Westerman, Hattori, Daniels & Adrian, LLP (57) ABSTRACT

A process control system that controls an industrial process implemented in a plant, may include: a network provided in the plant; a first field device that is connected to the network, the first field device being configured to output one of measurement data, which is obtained by measuring a state quantity in the industrial process, and first simulation data, which simulates the state quantity; a controller that is connected to the network, the controller being configured to perform control in response to one of the measurement data and the first simulation data output from the first field device; and a simulator configured to generate the first simulation data to be output from the first field device.

11 Claims, 5 Drawing Sheets

PROCESS CONTROL SYSTEM

BACKGROUND OF THE INVENTION

1. Field of the Invention

The present invention relates to a process control system.

Priority is claimed on Japanese Patent Application No. 2012-068042, filed Mar. 23, 2012, the content of which is incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

Conventionally, in plants and factories (hereinafter collectively referred to simply as plants), process control systems are implemented, which control various state quantities such as pressure, temperature, and flow amount in industrial processes, and a high level of automated operation is achieved. In these process control systems, in order to achieve a high level of control while securing safety, control systems such as distributed control systems (DCSs) and safety systems, such as safety instrumented systems (SISs), are provided.

In the above-noted distributed control systems, on-site devices called field devices such as measuring instruments and actuators and controllers that control the field devices are connected via a communication means, the controllers collect measurement data measured by the field devices, controlling various state quantities by actuating (controlling) field devices in accordance with the collected measurement data. The above-noted safety instrumented systems, by stopping the plant reliably in a safe condition when an emergency occurs, prevent accidents involving bodily injury and environmental pollution, and protect high-cost equipment.

The above-noted distributed control systems are generally subjected to various tests before the plant is built and operated. For example, a connection test to verify whether various field devices and controllers are properly connected and an operational verification tests to verify whether control programs used in the controllers are operating normally. In this case, the above-noted connection test cannot be performed unless the field devices and the controllers are installed in the plant and actually connected. In contrast, Japanese Unexamined Patent Application, First Publication No. 2004-29910 and Japanese Unexamined Patent Application, First Publication No. 2008-21135 disclose art enabling the above-noted operational verification test even in the condition in which there are no field devices (and no communication means connecting the field devices and the controllers).

In most conventional process control system, field devices and controllers are connected via an analog transmission line (for example, a transmission line used in 4 to 20 mA signal transmission), with analog signals being transmitted and received via analog transmission lines. In contrast, in order to implement a high level of functionality, in many process control systems in recent years, controllers and field devices are connected via a cable or wireless network, and digital signals are transmitted and received via a cable or wireless network.

In a conventional process control system, because there are direct one-to-one connections between field devices and interfaces of the controllers, once the tasks of installing and connecting the field devices and the controllers is completed, analog signal transmission and reception have been possible between the field devices and the controllers without a major problem. In process control system in recent years, however, in order to provide field devices with advanced functionality by digitization, the amount of data of the digital signals transmitted and received increases, and in order to achieve normal, safe operation, it is important to verify, for example, the following items (1) to (3) throughout the entire process control system.

(1) The influence on overall system performance by an increase in the amount of data.

(2) Whether or not the operating state of the highly functional field device is optimal (whether or not the device parameters of intelligent field devices are optimally set).

(3) The communication quality via the network and the system controllability under the influence thereof.

The above-noted item (1) is, for example, verified by measuring the degree of load on the network and the degree of load on the CPU (central processing unit) provided in the controllers. The above-noted item (2) is verified not only by judging with regard to the contents of the device parameters set in the individual field devices, but also by whether or not alarms and events notified from the field devices are proper. The above-noted item (3) is verified by measuring jitter, amount of delay, and number of re-transmissions, for example, when communicating via a network.

Such items, which apply throughout the entire process control system, basically cannot be verified unless the process control system is actually operating in a plant that is operating. For this reason, the tasks of verifying the above-noted items can be thought of as being performed after the commissioning task (task of performing trial runs of the plant to verify performance). However, if an abnormality is discovered in the verification tasks performed after the commissioning task, it is necessary to return to and correct the condition before the commissioning task was performed and then performing the commissioning task once again, this leading to the problem of extremely low efficiency. Also, when the commissioning task is performed, it is necessary to actually run material (samples) through the plant, thereby leading to a problem of cost as well.

SUMMARY

A process control system that controls an industrial process implemented in a plant, may include: a network provided in the plant; a first field device that is connected to the network, the first field device being configured to output one of measurement data, which is obtained by measuring a state quantity in the industrial process, and first simulation data, which simulates the state quantity; a controller that is connected to the network, the controller being configured to perform control in response to one of the measurement data and the first simulation data output from the first field device; and a simulator configured to generate the first simulation data to be output from the first field device.

The process control system may further include: a second field device that is connected to the network, the second field device being configured to output one of response data, which indicates a result of an operation of the state quantity in the industrial process under control of the controller, and second simulation data, which simulates the result of the operation of the state quantity. The simulator may be configured to generate a new first simulation data by using at least one of the second simulation data and a quantity controlled by the controller that are output from the second field device.

The first field device may include a first storage unit configured to temporarily store the first simulation data generated by the simulator.

The simulator may be configured to successively transmit the first simulation data to the first field device via the network during a time in which an operating mode of the first field device is set to a simulation mode that outputs the first simulation data.

The simulator may be configured to transmit the first simulation data via the network so as to cause the first field device to store the first simulation data beforehand, after which operating mode of the first field device is set to a simulation mode that outputs the first simulation data.

The network may be one of a cable network laid throughout the plant, a wireless network formed in the plant, and a network that is a mixture of the cable network and the wireless network.

The first field device may further include a first control unit having a first operating mode setting unit, the first control unit controlling operation of the first field device in accordance with operating mode set in the first operating mode setting unit. The first operating mode setting unit may be configured to set operating mode of the first field device to one of a normal mode and a simulation mode. The normal mode may be an operating mode in which the first field device measures the state quantity and transmits measurement data obtained by the first field device to the controller. The simulation mode may be an operating mode in which, without using a measurement results at the first field device, the first field device transmits the first simulation data stored in the first storage unit to the controller in place of the measurement data.

The second field device may include a second control unit having a second operating mode setting unit, the second control unit controlling operation of the second field device in accordance with operating mode set in the second operating mode setting unit. The second operating mode setting unit may be configured to set operating mode of the second field device to one of a normal mode and a simulation mode. If the normal mode is set in the second operating mode setting unit, the second field device may be operated under control of the controller and transmit to the controller response data indicating a result of an operation. If the simulation mode is set in the second operating mode setting unit, the second field device may transmit the second simulation data that is response data including at least a control quantity from the controller to the controller and the simulator.

If operating mode of the first field device and the second field device is set to a normal mode, the first field device may measure the state quantity to transmit measurement data that has been measured to the controller via the network. Upon reception of the measurement data from the first field device, the controller may calculate a control quantity for the second field device in accordance with the measurement data, control the second field device based on the control quantity, so as to obtain response data from the second field device.

If operating mode of the first field device and the second field device is set to a simulation mode, the simulator may transmit the first simulation data that has been generated to the first field device. Upon receiving the first simulation data from the simulator, the first field device may temporarily store each of the received first simulation data into a first storage unit. The first simulation data may temporarily store in the first storage unit is read out and transmitted to the controller. Upon receiving the first simulation data from the first field device, the controller may calculate a control quantity for the second field device in accordance with the first simulation data, and control the second field device. The second field device may transmit the second simulation data in accordance with the control quantity from the controller to the simulator. The simulator may receive the second simulation data transmitted from the second field device, and generate next simulation data in response to the received second simulation data. The simulator may determine whether or not transmission of all simulation data has been completed, and if determines that transmission of all simulation data has been completed, the simulator may change operating mode of the first field device and the second field device from the simulation mode to the normal mode.

A process control method for controlling an industrial process implemented in a plant, by using a process control system including: a network provided in the plant; a first field device that is connected to the network, the first field device being configured to output one of measurement data, which is obtained by measuring a state quantity in the industrial process, and first simulation data, which simulates the state quantity; a controller that is connected to the network, the controller being configured to perform control in response to one of the measurement data and the first simulation data output from the first field device; a simulator configured to generate the first simulation data to be output from the first field device; and a second field device that is connected to the network, the second field device being configured to output one of response data, which indicates a result of an operation of the state quantity in the industrial process under control of the controller, and second simulation data, which simulates the result of the operation of the state quantity. The process control method may include: setting operating mode of the first field device and the second field device to one of a normal mode and a simulation mode; and measuring, by the first field device, the state quantity and transmitting measurement data that has been measured to the controller via the network, and upon reception of the measurement data from the first field device, calculating, by the controller, a control quantity for the second field device in accordance with the measurement data to control the second field device based on the control quantity, so as to obtain response data from the second field device if operating mode of the first field device and the second field device is set to the normal mode.

The process control method may further include: transmitting, by the simulator, the first simulation data that has been generated to the first field device, temporarily storing, by the first field device, each of the received first simulation data into a first storage unit upon receiving the first simulation data from the simulator, transmitting the first simulation data temporarily stored in the first storage unit to the controller, calculating, by the controller, a control quantity for the second field device in accordance with the first simulation data to control the second field device upon receiving the first simulation data from the first field device, transmitting, by the second field device, the second simulation data in accordance with the control quantity from the controller to the simulator, receiving, by the simulator, the second simulation data transmitted from the second field device to generate next simulation data in response to the received second simulation data if operating mode of the first field device and the second field device is set to the simulation mode.

The process control method may further include: determining, by the simulator, whether or not transmission of all simulation data has been completed, and changing operating mode of the first field device and the second field device from the simulation mode to the normal mode if determined that transmission of all simulation data has been completed.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE PREFERRED EMBODIMENTS

The present invention will be now described herein with reference to illustrative preferred embodiments. Those skilled in the art will recognize that many alternative preferred embodiments can be accomplished using the teaching of the present invention and that the present invention is not limited to the preferred embodiments illustrated herein for explanatory purposes.

A process control system in accordance with a preferred embodiment of the present invention will be described in detail below, with references being made to the drawings.

Figure 1:
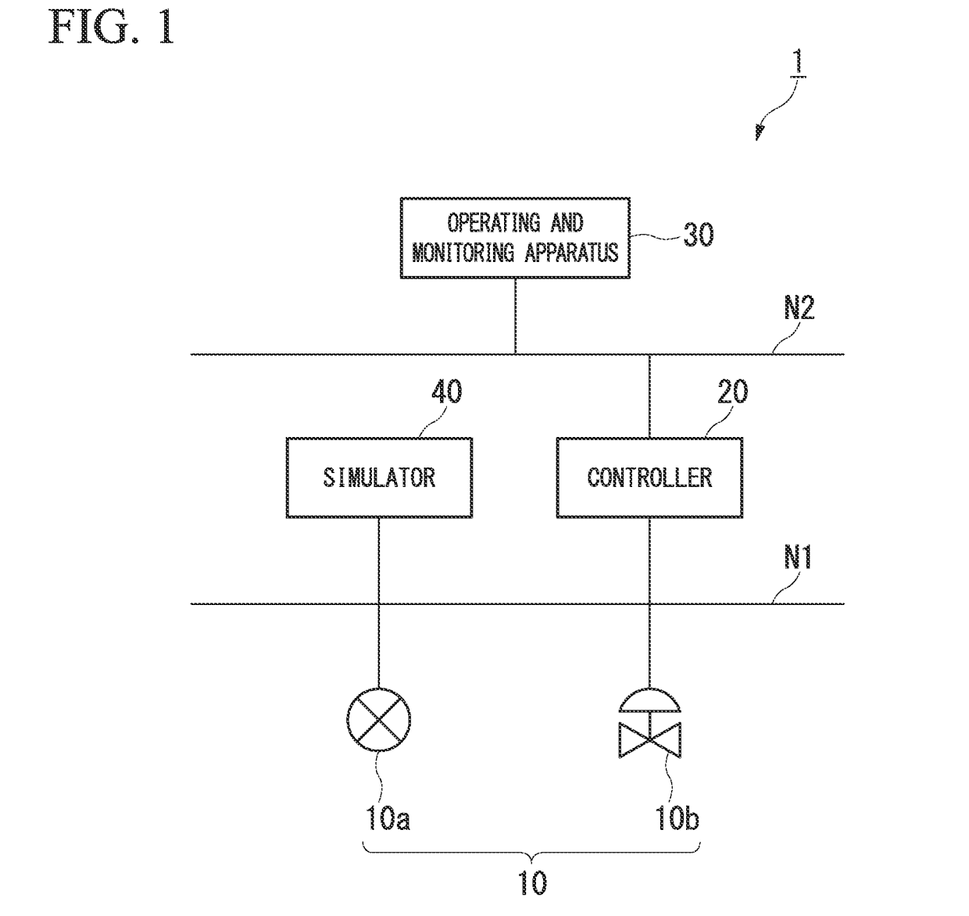
FIG. 1 is a block diagram illustrating the constitution of the main parts of the process control system in accordance with the first preferred embodiment of the present invention.

FIG. 1 is a block diagram illustrating the constitution of the main parts of the process control system in accordance with the first preferred embodiment of the present invention. As shown in FIG. 1, the process control system 1 of the first preferred embodiment has a plurality of field devices 10, a controller 20, an operating and monitoring apparatus 30, and a simulator 40 and, by controlling the plurality of field devices 10, the controller 20, under monitoring by the operating and monitoring apparatus 30 controls the industrial processes implemented in the plant (not shown). In the process control system 1 of the first preferred embodiment, by using the simulator 40 that simulates the operation of the plant, the system-wide items such as degree of load on the network can be verified without placing the plant in the operating condition.

The field devices 10 are, for example, sensor devices such as flow gauges and temperature sensors, valve devices such as flow amount control values and open/close valves, actuator devices such as fans and motors, and other devices installed on-site in the plant. In the first preferred embodiment, to facilitate understanding, the example described is that in which the state quantity to be controlled in the industrial process is flow amount of a fluid. For this reason, in FIG. 1, of the field devices 10 installed in the plant, one sensor device 10a (first field device) that measures the flow amount of a fluid, and one valve device 10b (second field device) that controls (operates) the flow amount of the fluid are illustrated. The sensor device 10a may be referred to as a first field device. The valve device 10b may be referred to as a second field device.

The field devices 10 are connected to a cable field network N1 (network) laid throughout the plant, and operate in accordance with the field device 10 functionalities, under the control of the controller 20. Specifically, the sensor 10a measures the flow amount of the fluid and transmits the obtained measurement data to the controller 20 via the field network N1. As will be described later, in place of the above-noted measurement data, the sensor device 10a can transmit simulation data (data simulating the flow amount of the fluid; first simulation data) generated by the simulator 40 to the controller 20.

The valve device 10b operates the flow amount of the fluid by adjusting the opening of the valve through which the fluid passes, under the control of the controller 20, and transmits response data indicating the result of the operation via the field network N1 to the controller 20. As will be described later, the valve device 10b, without actually adjusting the valve opening according to control from the controller 20, can transmit simulation data simulating flow amount operation results (second simulation data) to the simulator 40.

Figure 2:
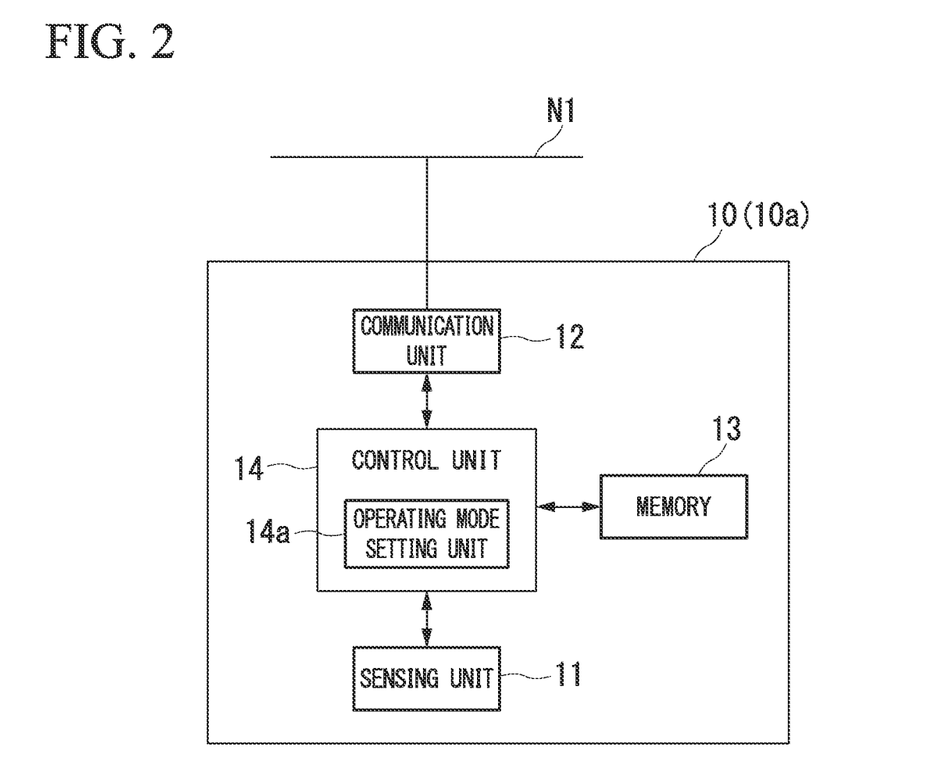
FIG. 2 is a block diagram illustrating the constitution of the main parts of a field device in accordance with the first preferred embodiment of the present invention.

FIG. 2 is a block diagram illustrating the constitution of the main parts of a field device in accordance with the first preferred embodiment of the present invention. In this case, of the plurality of field devices 10 installed in the plant, the description is for the sensor device 10a as an example. As shown in FIG. 2, the sensor device 10a has a sensing unit 11, a communication unit 12, a memory 13 (storage unit), and a control unit 14, measures the flow amount of the fluid, and transmits either the above-described measurement data or simulation data to the controller 20. The memory 13 may be referred to as a storage unit.

The sensing unit 11 has, for example, a transducer that transmits and receives ultrasonic signals, transmits an ultrasonic signal into a fluid flowing in a pipe, and receives an ultrasonic signal via the flow to measure the flow amount of the fluid. The communication unit 12 communicates via the field network N1 under the control of the control unit 14. Specifically, it receives simulation data transmitted from the simulator via the field network N1, and transmits the above-noted measurement data or simulation data to the controller 20.

The memory 13 stores measurement data obtained by the sensing unit 11 and simulation data received by the communication unit 12. The control unit 14 has an operating mode setting unit 14a, and controls the operation of the sensing unit 10a in accordance with the operating mode set in the operating mode setting unit 14a. In this case, the operating modes set in the operating mode setting unit 14a are the normal mode and the simulation mode, and the simulator 40, for example, sets one of these operating modes.

The normal mode is an operating mode in which the sensing unit 11 measures the flow amount of the fluid, and the measurement data obtained by the sensing unit 11 is transmitted to the controller 20 from the communication unit 12. In contrast, the simulation mode is an operating mode in which, without measurement by the sensing unit 11 (without using the measurement results at the sensing unit 11), simulation data received by the communication unit 12 and stored in the memory 13 is transmitted to the controller 20 from the communication unit 12 in place of the measurement data.

If the normal mode is set in the operating mode setting unit 14a, the control unit 14 controls the sensing unit 11, causing it to measure the flow amount of the fluid, and controls the communication unit 12, causing it to transmit the measurement data obtained at the sensing unit 11 to the controller 20. If the simulation mode is set in the operating mode setting unit 14a, the control unit 14, without controlling the sensing unit 11, controls the communication unit 12, causing it to receive simulation data from the simulator 40 and causing the storage of the simulation data into the memory 13, and causing it to transmit simulation data stored in the memory 13 to the controller 20.

The valve device 10b has substantially the same constitution as the sensor device 10a shown in FIG. 2, and a valve actuating unit (not shown) that actuates a valve, in place of the sensor unit 11 provided in the sensor device 10*a*. The operating modes set in the operating mode setting unit 14*a* of the valve device 10*b* as well are the normal mode and the simulation mode, and one of these operating mode, for example, is set by the simulator 40.

If the normal mode is set in the operating mode setting unit 14*a* of the valve device 10*b*, the control unit 14 of the valve device 10*b* controls the valve actuating unit, under control of the controller 20, to cause it to operate the flow amount of the fluid, and causes it to transmit to the controller 20, via the communication unit 12, response data indicating the result of the actuation. If the simulation mode is set in the operating mode setting unit 14*a* of the valve device 10*b*, the control unit 14 of the valve device 10*b*, without controlling the valve actuating unit, controls the communication unit 12, causing transmission of simulation data that is response data including at least a control quantity from the controller 20 to the controller 20 and the simulator 40.

Returning to FIG. 1, the controller 20 is connected to the field network N1 and control network N2, and collects measurement data (or simulation data) from the sensor device 10*a*, under the control of the operating and monitoring apparatus 30. The controller 20 also determines a control quantity of the valve device 10*b* from the collected measurement data (or simulation data), controls the valve device 10*b*, and obtains response data (or simulation data) from the valve device 10*b*.

The operating and monitoring apparatus 30 is connected to the control network N2, and monitor and manages the field devices 10 and the controller 20 that are connected to the field network N1. Specifically, it receives and sends various parameters with the controller 20 via the control network N2, and monitors the field devices 10. For example, it obtains parameters set in the field devices 10 from the controller 20 to understand the current measurement conditions, and causes the controller 20 to make new parameter settings to the field devices 10 so as to change the measurement conditions.

A laptop or desktop computer having an input device such as a keyboard or a pointing device, a display device such as a liquid-crystal display device, a CPU (central processing unit), and a memory, for example, implement the operating and monitoring apparatus 30. The operating and monitoring apparatus 30 displays the results of monitoring the field devices 10 and the controller 20 on the display device, thereby providing to an operator (in the plant) information indicating the condition of the plant, and controlling the controller 20 by instructions input to an input device by the operator.

The simulator 40 is connected to the field network N1, simulates the operation of the plant, generates simulation data that simulates the flow amount of fluid to be measured by the sensor device 10*a*, and transmits to the sensor device 10*a*. The simulator 40 is provided to enable the task of verifying system-wide items (for example, the degree of load on the field network N1) even without placing the plant in the operating condition. The simulator 40, similar to the operating and monitoring apparatus 30, is implemented, for example, by personal computer such as a laptop computer or a desktop computer.

Figure 3:
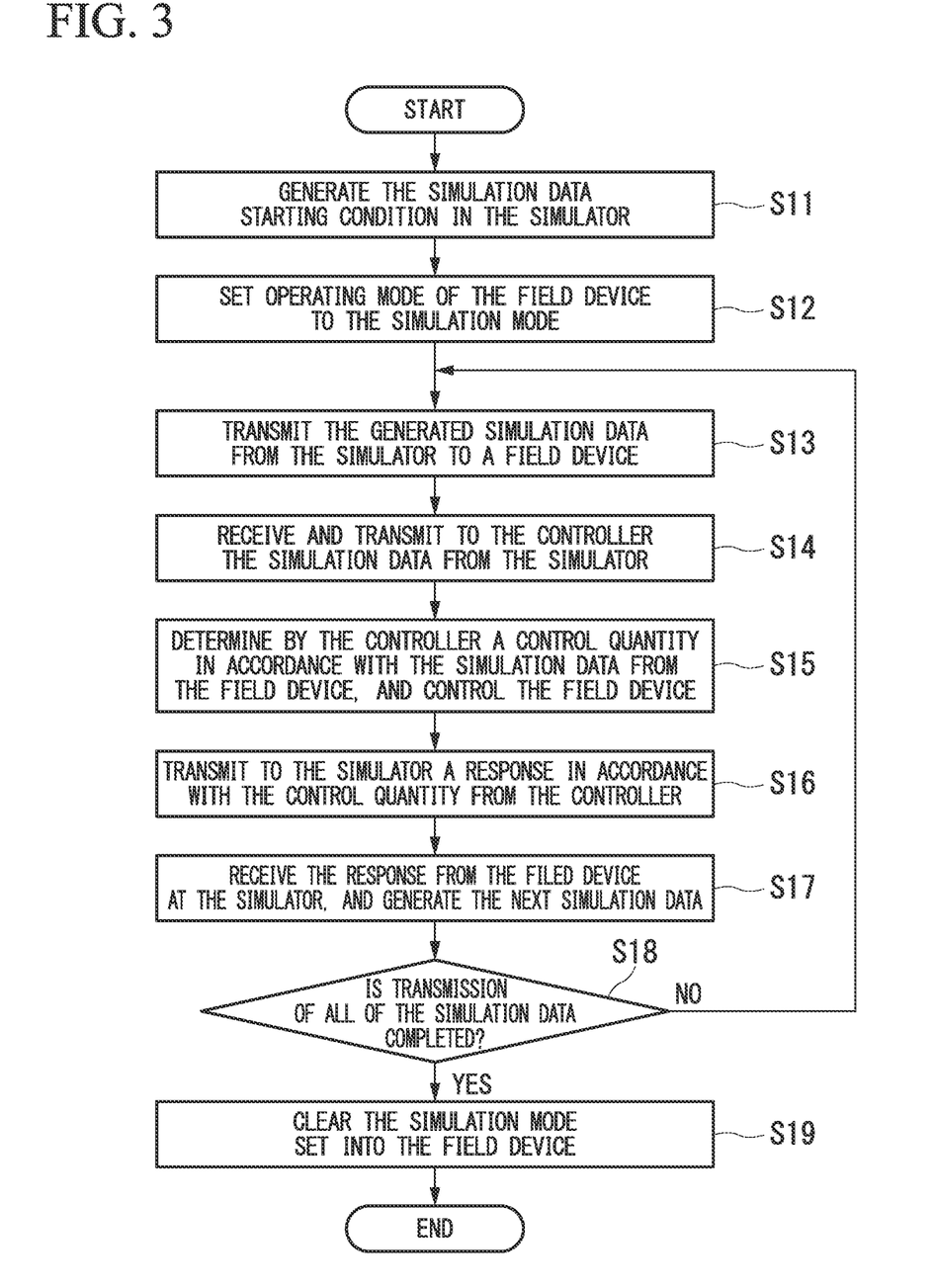
FIG. 3 is a flowchart illustrating one example of the operation of a process control system in accordance with the first preferred embodiment of the present invention.

Next, the operation of the process control system 1 having the above-noted constitution will be described. FIG. 3 is a flowchart illustrating one example of the operation of a process control system in accordance with the first preferred embodiment of the present invention. The flowchart shown in FIG. 3 shows the operation when the operating mode of the field devices 10 is set to the simulation mode. In the following, the operation when operating mode of the field devices 10 (sensor device 10*a* and valve device 10*b*) is set to the normal mode is first briefly described, followed by a description of the operation when the operating mode of the field devices 10 is set to the simulation mode, referring to FIG. 3.

(Operation when Set to the Normal Mode)

If the operating mode of the sensor device 10*a* and the valve device 10*b* is set to the normal mode, the control unit 14 of the sensor device 10*a* controls the sensing unit 11 and the flow amount of the fluid is measured. Measurement data indicating the fluid flow amount measured by the sensing unit 11 is transmitted to the controller 20 via the field network N1 by the control unit 14 of the sensor device 10*a* controlling the communication unit 12.

Upon reception of the measurement data from the sensor device 10*a*, the controller 20 determines a control quantity for the valve device 10*b* in accordance with the measurement data, controls the valve device 10*b*, and obtains response data from the valve device 10*b*. As noted above, if the operating mode of the sensor device 10*a* and the valve device 10*b* is set to the normal mode, the controller 20 calculates a control quantity for the valve device 10*b* in accordance with the measurement data from the sensor device 10*a*, and the valve device 10*b* is controlled based on the control quantity. Then, when the control of the valve device 10*b* is completed, the valve device 10*b* transmits to the controller 20 response data indicating the result of the flow amount operation.

(Operation when Set to the Simulation Mode)

First, when the operator operates the simulator 40 to issue an instruction to start simulation, the simulation data starting condition is generated in the simulator 40 (step S11). When the simulation data starting condition is generated, the simulator 40 sets the simulation mode into the operating mode setting unit 14*a* of the field devices 10 (sensor device 10*a* and valve device 10*b*), and the field devices 10 (sensor device 10*a* and valve device 10*b*) operating mode is set to the simulation mode (step S12).

When the above-noted processing is completed, the simulator 40 transmits the simulation data generated at step S11 to a field device 10 (sensor device 10*a*) (step S13). Upon receiving the simulation data from the simulator 40 the field device 10 (sensor device 10*a*) temporarily stores each of the received simulation data into the memory 13.

The simulation data, which is transmitted from the simulator 40 and temporarily stored in the memory 13 of the sensor device 10*a*, is read out by the control unit 14 and transmitted to the controller 20 by the communication unit 12 (step S14). If the operating mode of the sensor device 10*a* is set to the simulation mode, because the sensing unit 11 does not perform a measurement, the sensor device 10*a* transmits simulation data instead of measurement data to the controller 20.

Upon receiving the simulation data from the sensor device 10*a*, the controller 20 determines a control quantity for the valve device 10*b* in accordance with the simulation data, and controls the valve device 10*b* (step S15). In this case, if the operating mode of the valve device 10*b* is set to the simulation mode, an actual valve actuation is not performed in the valve device 10*b*. Instead, the valve device 10*b* transmits a response (second simulation data) in accordance with the control quantity from the controller 20 to the simulator 40 (step S16). The response transmitted from the valve device 10*b* is received at the simulator 40, and the next simulation data is generated in the simulator 40 in response to the received response (step S17).

When the above-noted processing is completed, the simulator 40 judges whether or not the transmission of all the simulation data has been completed (step S18). If the judgment is made that transmission of all of the simulation data has not been completed (NO judgment result), the processing of steps S13 to S17 is repeated. If, however, the judgment is that transmission of all the simulation data has been completed (YES judgment result), the simulator 40 clears the simulation mode set into the operating mode setting units 14*a* of the field devices 10 (sensor device 10*a* and valve device 10*b*), and sets the operating mode of the field devices 10 (sensor device 10*a* and valve device 10*b*) to the normal mode (step S19). The above completes the series of processing shown in FIG. 3.

By performing the operations described above, the simulation results are accumulated in the controller 20, the operating and monitoring apparatus 30, and the simulator 40. By using at least one of these accumulated simulation results, it is possible to perform verification of system-wide items such as controllability and operability accompanying an increase in the amount of data by using digital devices.

As described above, in the first preferred embodiment, simulation data that simulates the flow amount of a fluid to be measured by the sensor device 10*a* is generated in the simulator 40, the simulation data simulating the fluid flow amount is transmitted from the sensor device 10*a* to the controller 20, and simulation data simulating the results of flow amount actuation is transmitted from the valve device 10*b* to the controller 20. For this reason, system-wide items can be verified even without placing the plant in the operating condition.

In the first preferred embodiment, it is possible to perform a simulation with an existing plant remaining in the operation condition. For example, in the case of adding new field devices to expand a plant, if the operating mode of the new field devices to be added is set to the simulation mode, and the simulator 40 performs a simulation, it is possible to verify the effect of adding the new field devices, with the existing plant continuing to operate, and without causing the added part of the plant to operate.

Figure 4:
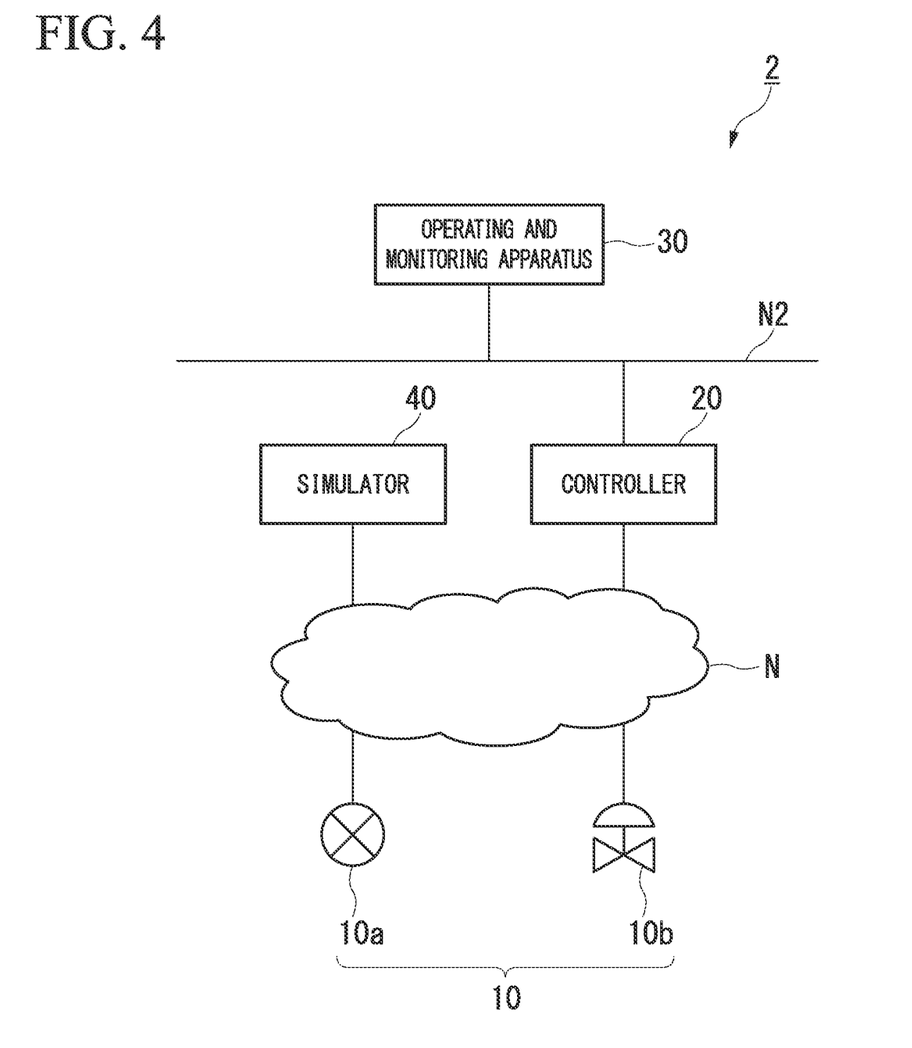
FIG. 4 is a block diagram illustrating a first variation example of a process control system in accordance with the first preferred embodiment of the present invention.

FIG. 4 is a block diagram illustrating a first variation example of a process control system in accordance with the first preferred embodiment of the present invention. In the process control system 1 shown in FIG. 1, the cable field network N1 connects the field devices 10, the controller 20, and the simulator 40. In contrast, in the process control system 2 shown in FIG. 4, the field devices 10, the controller 20, and the simulator 40 are connected via a wireless network N.

In this case, the wireless network N tends to have more jitter, delay amount, and a larger number of retransmissions during communication than does the cable field network N1. The process control system 2 in accordance with the first variation example can quickly achieve system controllability by enabling the verification of jitter, delay amounts, and the number of retransmissions in communication via the wireless network N without placing the plant in the operating condition.

Figure 5:
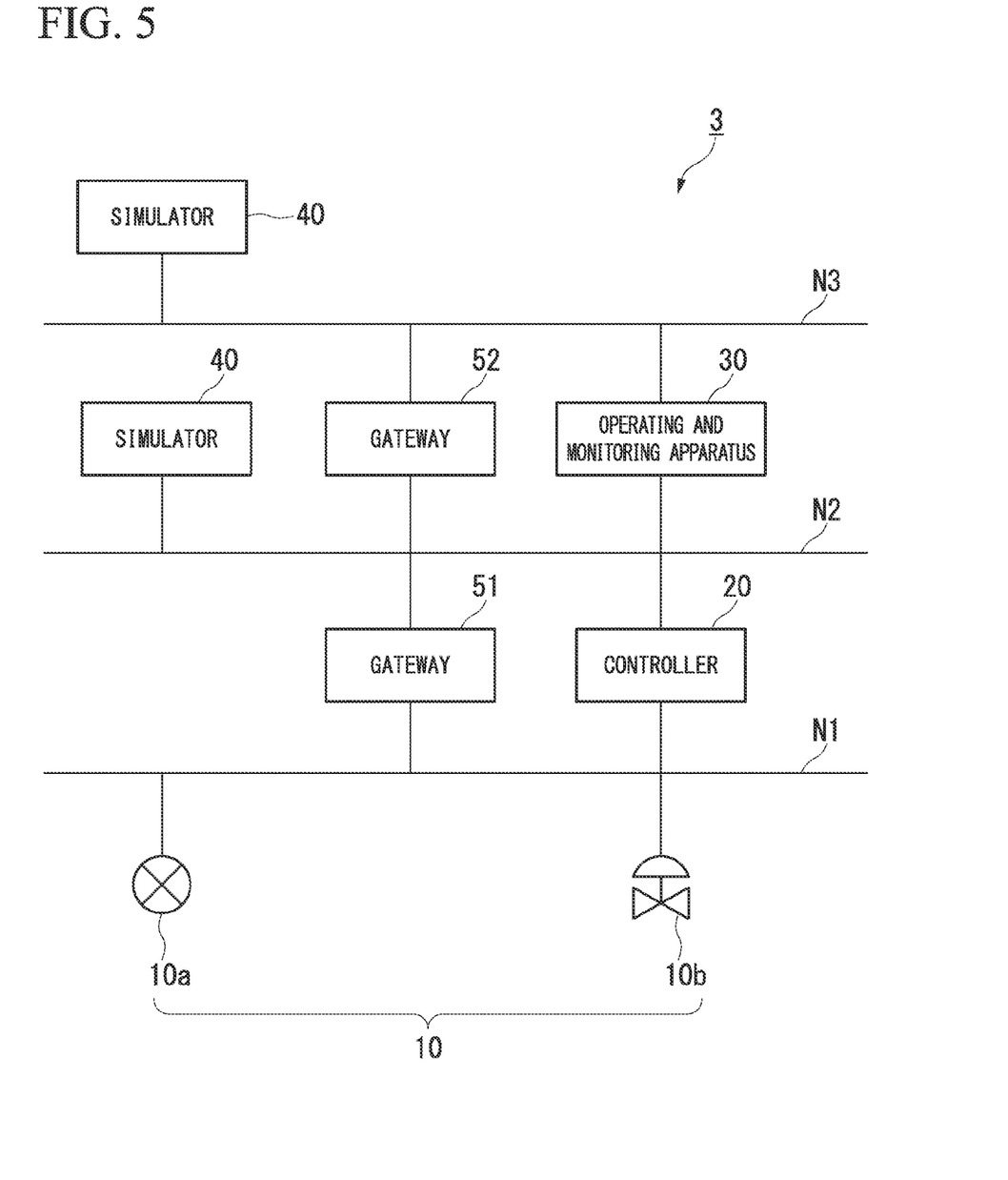
FIG. 5 is a block diagram illustrating a second variation example of a process control system in accordance with the first preferred embodiment of the present invention.

FIG. 5 is a block diagram illustrating a second variation example of a process control system in accordance with the first preferred embodiment of the present invention. In the process control system 3 shown in FIG. 5, the operating and monitoring apparatus 30 is connected to an information network N3, a gateway 51 is provided between the field network N1 and the control network N2, and a gateway 52 is provided between the control network N2 and the information network N3. By adopting the above-noted constitution, the simulator 40 can be connected to either the control network N2 or the information network N3.

Although the foregoing has been a description of a process control system in accordance with a preferred embodiment of the present invention, the present invention is not restricted to the above-described preferred embodiments, and can be freely modified, within the scope thereof. For example, in the above-noted preferred embodiment, the description has been for the example in which transmission of simulation data from the simulator 40 to the field devices 10 and transmission of simulation data from the field devices 10 to the controller 20 are performed during simulation. However, all of the simulation data generated in the simulator 40 may be stored beforehand in the field devices 10, with the transmission of simulation data from the simulator 40 to the field devices 10 during simulation being eliminated. Also, although in the above-noted preferred embodiment, the description has been for the example in which a single simulator 40 is connected to field network N1 and the like, the simulator 40 may be incorporated within the controller 20 and the operating and monitoring apparatus 30 or within the gateways 51 and 52.

Also, in the above-noted preferred embodiment, the description has been for the example in which the simulator 40 sets the operating mode of the field devices 10 (sensor device 10*a* and valve device 10*b*). However, the controller 20 or the operating and monitoring apparatus 30 may set the operating mode of the field devices 10. Further, in the above-noted preferred embodiment, the description has been for the example in which the field devices 10, the controller 20, and the simulator 40 are connected to a cable field network N1 or a wireless network N. However, they may be connected to a network that is a mixture of a cable network N and a wireless network. Additionally, the controller 20 and the field devices 10 (sensor device 10*a* and valve device 10*b*) may be multiply provided, and the numbers of each may differ. And further, although the simulator 40 has been shown to have a constitution that receives simulation data from the valve device 10*b*, a constitution may be adopted in which the controller 20 receives a control quantity to give to the valve device 10*b* and generates simulation data of the sensor device 10*a*.

The present invention provides a process control system enabling verification tasks to be performed of system-wide items before the trial run of the plant.

According to a preferred embodiment of the present invention, because a simulator generates simulation data that simulates state quantities in an industrial process, the simulation data being output from a first field device to a controller, which is made to perform control in response to the simulation data, it is possible to perform the simulation without operating the plant. This enables verification of system-wide items before trial running of the plant.

As used herein, the following directional terms "forward, rearward, above, downward, right, left, vertical, horizontal, below, transverse, row and column" as well as any other similar directional terms refer to those directions of an apparatus equipped with the present invention. Accordingly, these terms, as utilized to describe the present invention should be interpreted relative to an apparatus equipped with the present invention.

The term "configured" is used to describe a component, unit or part of a device includes hardware and/or software that is constructed and/or programmed to carry out the desired function.

Moreover, terms that are expressed as "means-plus function" in the claims should include any structure that can be utilized to carry out the function of that part of the present invention.

The term "unit" is used to describe a component, unit or part of a hardware and/or software that is constructed and/or programmed to carry out the desired function. Typical examples of the hardware may include, but are not limited to, a device and a circuit.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. A process control system that controls an industrial process implemented in a plant, the process control system comprising:
    a network provided in the plant;
    a first field device that is connected to the network, the first field device being configured to output one of measurement data, which is obtained by measuring a state quantity in the industrial process, and first simulation data, which simulates the state quantity;
    a second field device that is connected to the network, the second field device being configured to output one of response data, which indicates a result of an operation of the state quantity in the industrial process under control of the controller, and second simulation data, which simulates the result of the operation of the state quantity;
    a controller that is connected to the network, the controller being configured to perform control in response to one of the measurement data and the first simulation data output from the first field device; and
    a simulator configured to generate the first simulation data to be output from the first field device and configured to generate a new first simulation data by using at least one of the second simulation data and a control quantity controlled by the controller that are output from the second field device, wherein the second field device includes a second control unit having a second operating mode setting unit, the second control unit controlling operation of the second field device in accordance with operating mode set in the second operating mode setting unit, the second operating mode setting unit is configured to set operating mode of the second field device to one of a normal mode and a simulation mode, if the normal mode is set in the second operating mode setting unit, the second field device is operated under control of the controller and transmits to the controller response data indicating a result of an operation, and if the simulation mode is set in the second operating mode setting unit, the second field device transmits the second simulation data that is response data, including at least a control quantity from the controller, to the controller and the simulator.

2. The process control system according to claim 1, wherein the first field device includes a first storage unit configured to temporarily store the first simulation data generated by the simulator.

3. The process control system according to claim 1, wherein the simulator is configured to successively transmit the first simulation data to the first field device via the network during a time in which an operating mode of the first field device is set to a simulation mode that outputs the first simulation data.

4. The process control system according to claim 2, wherein the simulator is configured to transmit the first simulation data via the network so as to cause the first field device to store the first simulation data beforehand, after which operating mode of the first field device is set to a simulation mode that outputs the first simulation data.

5. The process control system according to claim 1, wherein the network is one of a cable network laid throughout the plant, a wireless network formed in the plant, and a network that is a mixture of the cable network and the wireless network.

6. The process control system according to claim 2, wherein
    the first field device further includes a first control unit having a first operating mode setting unit, the first control unit controlling operation of the first field device in accordance with operating mode set in the first operating mode setting unit,
    the first operating mode setting unit is configured to set operating mode of the first field device to one of a normal mode and a simulation mode,
    the normal mode is an operating mode in which the first field device measures the state quantity and transmits measurement data obtained by the first field device to the controller, and
    the simulation mode is an operating mode in which, without using a measurement results at the first field device, the first field device transmits the first simulation data stored in the first storage unit to the controller in place of the measurement data.

7. The process control system according to claim 1, wherein
    if operating mode of the first field device and the second field device is set to a normal mode,
    the first field device measures the state quantity to transmit measurement data that has been measured to the controller via the network, and
    upon reception of the measurement data from the first field device, the controller calculates a control quantity for the second field device in accordance with the measurement data, and controls the second field device based on the control quantity, so as to obtain response data from the second field device.

8. The process control system according to claim 7, wherein
    if operating mode of the first field device and the second field device is set to a simulation mode,
    the simulator transmits the first simulation data that has been generated to the first field device,
    upon receiving the first simulation data from the simulator, the first field device temporarily stores each of the received first simulation data into a first storage unit,
    the first simulation data temporarily stored in the first storage unit is read out and transmitted to the controller,
    upon receiving the first simulation data from the first field device, the controller calculates a control quantity for the second field device in accordance with the first simulation data, and controls the second field device,
    the second field device transmits the second simulation data in accordance with the control quantity from the controller to the simulator,
    the simulator receives the second simulation data transmitted from the second field device, and generates next simulation data in response to the received second simulation data, and
    the simulator determines whether or not transmission of all simulation data has been completed, and if determines that transmission of all simulation data has been completed, the simulator changes operating mode of the first field device and the second field device from the simulation mode to the normal mode.

9. A process control method for controlling an industrial process implemented in a plant, comprising:

outputting, by a first field device connected to a network provided in the plant, one of measurement data, which is obtained by measuring a state quantity in the industrial process, and first simulation data, which simulates the state quantity;

performing control, by a controller connected to the network, in response to one of the measurement data and the first simulation data output from the first field device;

generating, by a simulator, the first simulation data to be output from the first field device;

outputting, by a second field device that is connected to the network, one of response data, which indicates a result of an operation of the state quantity in the industrial process under control of the controller, and second simulation data, which simulates the result of the operation of the state quantity;

setting operating mode of the first field device and the second field device to one of a normal mode and a simulation mode; and measuring, by the first field device, the state quantity and transmitting measurement data that has been measured to the controller via the network, and upon reception of the measurement data from the first field device, calculating, by the controller, a control quantity for the second field device in accordance with the measurement data to control the second field device based on the control quantity so as to obtain response data from the second field device if operating mode of the first field device and the second field device is set to the normal mode, and if the simulation mode is set, the second field device transmits the second simulation data that is response data, including at least a control quantity from the controller, to the controller and the simulator.

10. The process control method according to claim 9, further comprising:

transmitting, by the simulator, the first simulation data that has been generated to the first field device, temporarily storing, by the first field device, each of the received first simulation data into a first storage unit upon receiving the first simulation data from the simulator, transmitting the first simulation data temporarily stored in the first storage unit to the controller, calculating, by the controller, a control quantity for the second field device in accordance with the first simulation data to control the second field device upon receiving the first simulation data from the first field device, transmitting, by the second field device, the second simulation data in accordance with the control quantity from the controller to the simulator, receiving, by the simulator, the second simulation data transmitted from the second field device to generate next simulation data in response to the received second simulation data if operating mode of the first field device and the second field device is set to the simulation mode.

11. The process control method according to claim 10, further comprising:

determining, by the simulator, whether or not transmission of all simulation data has been completed, and changing operating mode of the first field device and the second field device from the simulation mode to the normal mode if determined that transmission of all simulation data has been completed.

* * * * *